United States Patent [19]
Ferguson

[11] B 3,985,689
[45] Oct. 12, 1976

[54] SORBENT FOAM MATERIAL

[75] Inventor: Alan N. Ferguson, Harlow, England

[73] Assignee: Minnesota Mining and Manufacturing Company, St. Paul, Minn.

[22] Filed: May 20, 1974

[21] Appl. No.: 471,579

[44] Published under the second Trial Voluntary Protest Program on January 13, 1976 as document No. B 471,579.

[30] Foreign Application Priority Data
May 25, 1973 United Kingdom............... 25182/73

[52] U.S. Cl.................................. 260/2.5 R; 55/74; 210/24; 210/37 R; 210/38 R
[51] Int. Cl.²................... C08G 69/46; C08G 73/06
[58] Field of Search............. 260/2.5 R; 210/24, 37, 210/38

[56] References Cited
UNITED STATES PATENTS

| | | | |
|---|---|---|---|
| 2,950,295 | 8/1960 | Zimmer | 260/397.7 |
| 3,306,862 | 2/1967 | Mageli et al. | 260/2.5 |
| 3,493,522 | 2/1970 | Webb | 260/2 |

Primary Examiner—John Kight, III
Attorney, Agent, or Firm—Alexander, Sell, Steldt & DeLaHunt

[57] ABSTRACT

A black sorbent thermoset foam which has been prepared by the pyrolysis of a composition comprising at least one Lewis acid metallic salt and at least one aromatic nitrogen-containing compound having the general formula:

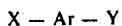

$$X - Ar - Y$$

in which Ar represents an aromatic nucleus on which X and Y are substituents directly attached to the nucleus, X represents a substituent having a negative Hammett sigma constant and attached to the aromatic nucleus by a nitrogen, oxygen or sulphur atom, and Y represents a substituent having a positive Hammett sigma constant and attached to the aromatic nucleus by a nitrogen atom, and substituents X and/or Y optionally forming part of a ring fused onto the aromatic nucleus, is an effective sorbtive substance for polar molecules and materials.

16 Claims, No Drawings

SORBENT FOAM MATERIAL

This invention relates to sorbent materials and in particular materials which will sorb a wide variety of gases and vapours, and to the use of these materials in the sorption of various molecules and in particular polar molecules.

A widely used adsorbent material is activated charcoal. This can be given a very large adsorbing surface area so that relatively large quantities of gases and vapours can be physically adsorbed. The physical adsorption involves quite loose bonding and so the charcoal can be regenerated by heating to drive off the adsorbed molecules. Active charcoal is not a very good adsorbent for polar molecules and so in places where polar molecules are to be adsorbed from an environment such as a gas stream, it is necessary to use large amounts of activated charcoal to ensure complete adsorption of the polar molecules.

It is, therefore, an object of this invention to provide sorbent materials which are capable of sorbing relatively large quantities of polar molecules very strongly.

According to the invention there is provided a method of making a black sorbent thermoset foam comprising pyrolysing a mixture of at least one aromatic nitrogen-containing compound having the general formula:

$$X - Ar - Y$$

in which Ar represents an aromatic nucleus on which X and Y are substituents directly attached to the aromatic nucleus and which optionally carries additional substituents, X represents a substituent having a negative Hammett sigma constant and attached to the aromatic nucleus by a nitrogen, oxygen or sulphur atom, and Y represents a substituent having a positive Hammett sigma constant and attached to the aromatic nucleus by a nitrogen atom, the substituents X and/or Y optionally forming part of a ring fused onto the aromatic nucleus, and which aromatic nitrogen-containing compound is liquid under the pyrolysis conditions and at least one Lewis acid metallic salt, and removing the Lewis acid metallic salt from the material resulting from the pyrolysis.

It is generally preferred in the aromatic nitrogen-containing starting materials to have no more than about 50 carbon atoms per set of X and Y groups (including any carbon atoms in X and Y). More preferably there are no more than about 30 carbon atoms per set of X and Y and most preferably no more than 15 carbon atoms.

The thermoset foams which have been made in this way are found to have high specific surface areas. For example we have found that they can easily have specific surface areas, measured by standard BET methods as described by Brunauer, Emmett and Teller in the Journal of the American Chemical Society, 60, page 309 (1938), of over $100m^2/g$ and can often have areas as high as $900m^2/g$ or even higher.

These thermoset foams have very good chemisorption properties and so are excellent sorbent materials for polar molecules such as, for example, organic acids and bases, organic halogen compounds, the halogens such as chlorine, bromine and iodine, strong acids such as HCl and other acids such as HF, $H_2S$ and HCN, heavy metal ions such as $Hg^{2+}$, $Ag^+$, and $Pb^{2+}$ from liquids, oxides of nitrogen such as $NO_2$ and oxides of sulphur such as $SO_2$ and $SO_3$.

Black thermoset foams such as those prepared according to the present invention have also been described in our United Kingdom copending Patent Application No. 25181/73 to which reference is made. That application is equivalent to the application filed concurrently with this case having application Ser. No. 469,102, the inventors of which are Messrs. Errede and Sinclair. According to one aspect of the invention described in that Application a black sorbent thermoset foam which has been prepared by the pyrolysis of a liquid composition comprising at least one aromatic nitrogen-containing compound having the general formula:

$$X - Ar - Y$$

in which Ar represents an aromatic nucleus on which X and Y are substituents directly attached to the aromatic nucleus and which optionally carries additional substituents, X represents a substituent having a negative Hammett sigma constant and attached to the aromatic nucleus by a nitrogen, oxygen or sulphur atom and Y represents a substituent having a positive Hammett sigma constant and attached to the aromatic nucleus by a nitrogen atom, the substituents X and/or Y optionally forming part of a ring fused onto the aromatic nucleus, the thermoset foam having a specific surface area of at least $50m^2/g$;

while according to another aspect of the invention described in that Application there is provided a black sorbent thermoset foam which has been prepared by the pyrolysis of a liquid composition comprising at least one aromatic nitrogen-containing compound, having the general formula:

$$X - Ar - Y$$

in which Ar represents an aromatic nucleus on which X and Y are substituents directly attached to the aromatic nucleus and which optionally carries additional substituents, X represents a substituent having a negative Hammett sigma constant and attached to the aromatic nucleus by a nitrogen, oxygen or sulphur atom and Y represents a substituent having a positive Hammett sigma constant and attached to the aromatic nucleus by a nitrogen atom, the substituents X and/or Y optionally forming part of a ring fused onto the aromatic nucleus, the thermoset foam being non-carcinogenic or otherwise toxic to humans and substantially free from low molecular weight fusible toxic components and so capable of being safely handled by man.

We believe that the Lewis acid metallic salts should be capable of co-ordinating with amine groups and these salts are of the well known Freidel Crafts class of catalysts. Examples include aluminium chloride and ferric chloride, and the more expensive boron trifluoride, silicon tetrachloride, titanium tetrachloride, tin tetrachloride, indium trichloride, and germanium tetrachloride. The preferred Lewis acid metallic salt is however zinc chloride which currently appears to give the highest specific surface areas.

Although we are not certain we believe that the Lewis acid metallic salt acts rather like a filler forming layers between condensed reacted molecules during the pyrolysis to assist in defining the foam structure required on a molecular scale. Thereafter removal of the salt leaves pores which give the thermoset foams of the invention their very high specific surface areas. In addition the Lewis acid metallic salts may have a corrosive action upon the thermoset foams so forming additional voids or pores.

When the mixture of aromatic nitrogen-containing compound and Lewis acid metallic salt is heated to pyrolysis temperature, a sudden and vigorous reaction occurs with the formation of a voluminous black sponge of the foam. As noted above, the aromatic nitrogen-containing compound should be liquid under the reaction conditions. Their volatility under these conditions must not be too high, however, since if they vaporise off, this sudden expansion to give the foam will not occur.

The resulting sponges can then be crushed to give a powder which destroys the large voids in the sponges and the Lewis acid metallic salt leached or otherwise removed from the powder or sponge to leave a black thermoset foam according to the invention having a microporous structure. The removal of the Lewis acid metallic salts can be readily achieved by washing the foam with a dilute acid followed by water.

In addition the foam can thereafter be exhaustively purified by washing with a dilute base, water and an organic solvent. The washing should desirably be in this order since if organic solvent is volatile it seems to displace sorbed water and traces of it can then be allowed to evaporate away once it has washed any low molecular weight fusible organic species from the foam.

Another way of purifying the foam is to subject it after removal of the acid salt to a further pyrolysis step at a higher temperature, e.g. 300° to 800°C, for a period to ensure substantially complete reaction of the aromatic nitrogen-containing compound. This pyrolysis can be effected under a controlled atmosphere, e.g. a nitrogen atmosphere which may be saturated with steam. Thus further pyrolysis may also be found to have the effect of increasing the surface area of the foam with consequent decrease in the weight of the foam.

The pyrolysis can be effected by heating the reaction mixture to a relatively low temperature, e.g. around 200°C, but once pyrolysis starts, an exothermic reaction occurs and it then appears that the temperature of the overall mass increases to a temperature of the order of 300°C, although within the mass there may, however, be localised regions where the temperature rise is much higher. Once the exothermic reaction starts no further external heating is required, the heating to pyrolysis temperature being merely to initiate the reaction.

As noted above the aromatic nitrogen-containing compound is one having the general formula:

$$X - Ar - Y$$

in which X, Ar and Y are as defined above. The compound contains at least one nitrogen atom. A nitrogen atom forms part of the substituent Y but the compound can contain one or more additional nitrogen atoms, e.g. as part of the substituent X or as part of the aromatic nucleus.

The Hammett sigma values of a substituent is a measure of the oxidising or reducing properties of that group. For a discussion of the values and their measurement reference is made for example to "Advanced Organic Chemistry: Reaction Mechanisms and Structure" by J. March-McGraw-Hill, page 238 and Chem. Rev. 53 191 (1953) Jaffe.

The substituent X which has a negative Hammett sigma value is a substituent which has a reducing action. Examples of suitable substituents X are:

—$NH_2$,
—OH,
—SH,
—NHR where R represents an alkyl group preferably one containing 1 to 8 carbon atoms, an aryl group, e.g. a phenyl group, or an alkenyl group, e.g. a vinyl group,
—$NRR^1$ where R is as above and $R^1$ represents the same or a different alkyl group, aryl group or alkenyl group,
—NH — $NH_2$,
—NH — $NHR^2$ where $R^2$ represents an alkyl group, e.g. one containing 1 to 8 carbon atoms,
—NH — $NR^2R^3$ where $R^2$ is as above and $R^3$ represents the same or different alkyl group,
—NH $R^4$ where $R^4$ represents a repeating moiety, e.g. —CH—$CH_2$ in a polymeric compound or the atoms required to complete a divalent link which completes a ring fused to the aromatic nucleus Ar, e.g. —NH—CH=CH,
—N=CH—A where A represents an aromatic group such as a phenyl group which is optionally substituted, and

where $R^5$ represents an alkyl group, preferably one containing 1 to 8 carbon atoms, an -$NH_2$ group, an alkenyl group, e.g. vinyl or the grouping $R^4$.

With the exception of the groups —SH and OH, we believe that many if not all of the above groups may be precursors for the group —$NH_2$ and that these groups initially decompose to an amine group before or during the pyrolysis reaction. The size or weight of the groups pendant on the attaching nitrogen, oxygen, and sulphur atoms of the X and Y groups is not critical as it is believed that these groups are expelled during pyrolysis and do not significantly effect the reaction path. Some of the X and Y groups may even be completely expelled. For purposes of economy, however, it is desirable to limit the size of alkyl groups to 1 to 8 carbon atoms, and the aryl group to about 20 carbon atoms, although alkyl groups of up to 20 carbon atoms and aryl group having up to 40 carbon atoms are not unreasonable in the practice of this invention (although requiring more substantial efforts at purification).

The substituent Y which has a positive Hammett sigma value is a substituent which has an oxidising action. Examples of suitable substituents Y are:

$NO_2$
NO
— N = N —, and

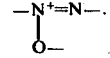

In each case the substituent may form part of a ring which is fused onto the aromatic nucleus represented by Ar. In such case, however, the nitrogent-containing compound must of course contain two rings, one of which forms the aromatic nucleus Ar and the other of which the substituent X or Y. Thus, for example, in the case of the compound 5-nitroindoline, the nitro group is the substituent Y, the benzene ring the nucleus Ar and the divalent link —NH—CH$_2$—CH$_2$—fused to the benzene ring the substituent X.

The preferred substituents X are in amino and hydroxy group.

The position of the substituents on the aromatic nucleus are not critical but preferably, when X represents an amino or hydroxy group and Y represents a nitro group, the amino or hydroxy group is in the ortho or para position relative to the nitro group.

The aromatic nucleus represented by Ar contains at least one aromatic ring. It can, however, contain more than one aromatic ring, e.g. 2, 3 or more, and these rings can be fixed to one another or be linked by a conjugate linking group. The simplest aromatic nucleus is a benzene ring but other aromatic nuclei such containing 5 and 6 membered carbon or heterocyclic rings such as the following examples of two ring nuclei: naphthalene, and indoline

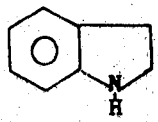

and the following examples of three ring nuclei: anthracene, and fluorene

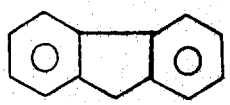

are possible.

The aromatic nucleus can contain substituents other than X and Y such as, for example, lower alkyl groups, e.g. methyl, halogen atoms, e.g. chlorine, and carboxylic groups. In addition there may be more than one X and/or Y substituent on the aromatic nucleus. Any such additional substituents to X and Y should be chosen so as not to affect the pyrolysis reaction which is thought to be a type of Wohl-Aue reaction. Groups which are both non-labile under the reaction conditions and which block condensation of the nitrogen-containing aromatic compounds during pyrolysis are undesirable. Thus in the case of the pyrolysis of a nitroaniline the condensation reaction can be schematically represented as follows:

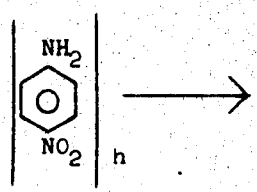

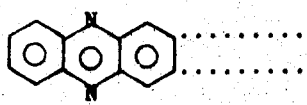

Examples of aromatic nitrogen-containing compounds which we have found can be pyrolysed on their own or in admixture to give foams according to the invention are:

m - nitroacetanilide,
p - nitroacetanilide,
2 - nitroaniline,
4 - nitroaniline,
amino - nitro - toluenes,
amino - nitro - xylene,
2,6 - dibromo - 4 - nitroaniline,
2,6 - dichloro - 4 - nitroaniline
4 - nitrophenylhydrazine,
bis - (2-nitrophenyl urea),
nitronaphthyl amines having vacant positions ortho to the nitro and amino-groups such as 5 - nitro - 1 - naphthylamine
5 - nitroindoline,
2 - chloro - 4 - nitroaniline,
2 - methyl - 4 - nitroaniline,
5 - amino - 2 - nitrobenzoic acid,
2 - amino - 4 - nitrophenol,
3 - methyl - 4 - nitrophenol,
2 - amino - 7 - nitrofluorene,
4 - nitrosophenol,
4 - nitrophenol,
4 - methylaminonitrobenzene,
4 - dimethylaminonitrobenzene,
nitrated coal tar residues containing multicyclic compounds,
the polymeric compound

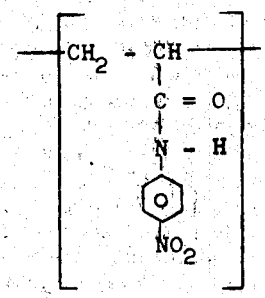

2-amino-5-nitropyridine,
the compound

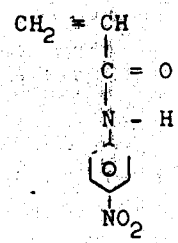

the compound

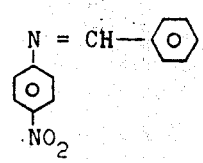

and
the compound

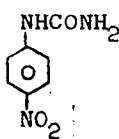

The thermoset foams of the invention are believed to have a polyquinoxaline structure and so it appears that they have the general repeating structure:

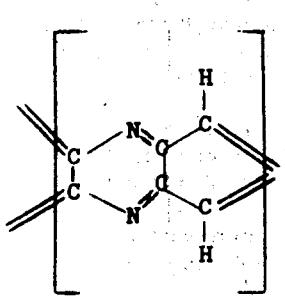

with cross-linking between the chains of these repeating fused aromatic rings, the positions of the cross-links being from the carbon atoms to which the hydrogen atoms are attached after removal of the latter. This structure makes the thermoset foam very stable both to heat and oxidation. Thus a piece of the foam can be held in a flame and while it will glow and gradually burn away, it will stop burning immediately it is removed from the flame and is not apparently decomposed by this treatment. This structure is consistent with the black colour of the foam and with the elementary analysis of the foam which gives a nitrogen content in the range of about 12 to 20%.

In this foam structure it appears that the nitrogen atoms impart the chemisorption properties. It therefore appears that the larger the percentage nitrogen content of the foam the better are its chemisorption properties. Preferably therefore the substituent X is one which is linked by a nitrogen atom to the aromatic nucleus.

Once the powder has been prepared and optionally purified or pyrolysed, it can be pelletised to bring it into a form suitable for handling and use as a sorbent. There are, however, many other ways in which it can be made into a readily handleable form e.g. by mixing it with a binding agent such as cellulose or peat or incorporating it into a fabric such as a felt type fabric of, for example, cellulose.

As noted above, the thermoset foam can sorb very strongly relatively large amounts of, in particular, polar molecules. When one wishes to remove the polar molecules from a fluid containing them, the thermoset foam is placed in contact with the fluid. In the case where the fluid is a gas, the gas can be passed over or through a bed of the thermoset foam, which may be in the form of a powder, pellets or incorporated in a fabric as noted above, while when the fluid is a liquid the foam in a suitable physical form can be placed in contact with the liquid.

The thermoset foams are very useful in removing noxious or poisonous gases from the air. Thus they are very useful as the, or one of the, active sorbing materials in face masks or filters for air streams from chemical processes or cooking or in air conditioning. For example, when the thermoset foam is used in face masks, it is highly effective in removing poisonous gases such as HCN or HF which may be present near electrochemical plating processes. $H_2S$, and $SO_2$ may be present in waste gases from combustion processes and so the thermoset foams are very useful in removing these sulphur compounds and preventing their release into the atmosphere. A further use of the thermoset foams is in cooker hoods for removing unpleasant cooking odours from kitchens. In any of these uses the thermoset foam may be admixed with activated charcoal which tends to have a high sorptive capacity for these molecules for which the foam of the invention has a relatively low sorptive capacity.

The thermoset foams of the invention can also be used to remove unwanted molecules, particularly polar molecules such as heavy metal ions from liquids such as water. One such use is in drying water — wet hydrocarbons such as petroleum or chlorohydrocarbons such as trichloroethylene which is used in dry-cleaning. The foams may also remove other unwanted molecules from such dry cleaning liquids to clean them for re-use. A further use is to improve the flavour of potable water thereby making it palatable to drink.

The thermoset foams of the invention also have uses as molecular sieves. For example the foams can be used in place of zeolite under acid conditions in the petroleum industry since zeolite tends to be decomposed by these acid conditions whereas the foams of the invention are not. By control of the manufacture and purification or post-pyrolysis of the foams of the invention one can achieve the required micropore size for use as a molecular sieve for a particular application.

The invention will now be illustrated by the following Examples in which all parts are by weight unless otherwise indicated.

Example 1

Two parts of powdered zinc chloride were intimately mixed with one part of 4-nitroaniline, heated until molten and then stirred at 180°C for about 1 hour. The temperature was then increased to approximately 210°C to induce the next stage of the reaction and the sudden formation of an expanded black thermoset sponge. This sponge was collected, crushed, washed with dilute hydrochloric acid, to leach out the zinc chloride and thereafter washed successively with water (to pH 4), dilute sodium hydroxide, water (to pH 8) and acetone, and dried at 80°C for 12 hours.

The specific surface area of this thermoset foam was found to be a function of the zinc chloride/4-nitroaniline ratio by repeating the experiment with different rations as shown in the following Table I.

Table I

| $ZnCl_2$/p-nitroaniline ratio (w.w.) | 1.5:1 | 2:1 | 2.5.1 | 3:1 | 4:1 |
|---|---|---|---|---|---|
| Methylene blue uptake (mg/g) | | 140 | 280 | 150 | 50 | 25 |

Table I-continued

| Specific surface area by N₂ isotherm (m²/g) | — | 950 | 645 | — | 152 |
|---|---|---|---|---|---|

The methylene blue uptake was determined by a standard procedure as described by H. W. Hassler, Activated Carbon, Chemical Pub. Co. Inc., 1963 while the specific surface area was determined as noted above by the BET method using nitrogen at −196°C.

Example 2

Two parts anhydrous aluminium chloride were mixed with one part of 4-nitroaniline and the mixture heated slowly until an exothermic reaction began. In this case the initial heating temperature was only 85°C. The thermoset foam was collected and washed exactly as described in Example 1, dried at 80°C and the methylene blue uptake was measured and found to be 80 mg/g.

Example 3

The procedure outlined in Example 1 was repeated except that anhydrous ferric chloride was used instead of the zinc chloride. The methylene blue uptake for the thermoset foam isolated was 140 mg/g.

Examples 4 to 13

Following the procedure given in Example 1 further aromatic nitrogen-containing compounds and zinc chloride were reacted in the weight for weight proportions shown in the following Table II. The specific surface areas of the resulting foams were measured and in addition the methylene blue and iodine uptakes were measured in some cases and all are listed in Table II.

Table II

| Example No. | Aromatic compound | Weight Ratio compound/zinc chloride | Specific surface area (m²g⁻¹) | Methylene blue uptake (mg/g) | Iodine uptake (mg/g) |
|---|---|---|---|---|---|
| 4 | 4-nitrosophenol | 1:2 | 140 | 24 | 761 |
| 5 | 4-nitrosophenol | 1:1 1/2 | 221.7 | — | — |
| 6 | 4-nitrosophenol | 1:2 1/2 | 178.3 | — | — |
| 7 | 4-nitrothiophenol | 1:2 | 138.5 | — | — |
| 8 | 2-chloro-4-nitroaniline | 1:2 | 60 | 44 | 726 |
| 9 | 2-methyl-4-nitroaniline | 1:2 | 600 | 16 | 844 |
| 10 | 2-amino-4-nitrophenol | 1:2 | 60 | 23 | 549 |
| 11 | 3-methyl-4-nitrophenol | 1:2 | 400 | 26 | 820 |
| 12 | 5-nitroindoline | 1:2 | 227 | 0 | 786 |
| 13 | 5-nitro-1-naphthylamine | 1:2 | 653 | — | — |

As can be seen for particular foams if they have say a high surface area they do not necessarily have a large methylene blue or iodine uptake. It appears that these three values of surface area as measured using nitrogen, and the methylene blue and iodine uptakes gave an indication of the pore size distribution in the foam. Thus nitrogen is the smallest molecule, iodine is the medium sized molecule and methylene blue the largest molecule of the three and so the values in Table II give an indication of the relative pore sizes and distribution of pore sizes in the various foams.

Examples 14 and 15

The procedures of Example 2 and 3 were repeated by pyrolysing 4-nitroaniline with AlCl₃ (Example 14) and with FeCl₃ (Example 15), respectively, and the specific surface areas and methylene blue and iodine uptakes of the resulting foams measured as before. The results are reported in the following Table III.

| Example No. | Specific surface area (m²g⁻¹) | Methylene blue uptake (mg/g) | Iodine uptake (mg/g) |
|---|---|---|---|
| 14 | 189 | 13.1 | 789 |
| 15 | 309 | 24.9 | 652 |

I claim:

1. A black sorbent thermoset foam which has been prepared by the pyrolysis of a composition, liquid at the pyrolysis temperature, comprising at least one Lewis acid metallic salt and at least one aromatic nitrogen-containing compound having the general formula:

X — Ar — Y in which Ar represents an aromatic nucleus to the wherein X represents a substituent having a negative Hammett sigma constant and attached by a nitrogen, oxygen or sulphur atom, and Y represents a substituent having a positive Hammett sigma constant and attached by a nitrogen atoms, the substituents X and/or Y forming part of a ring fused onto the aromatic nucleus or are attached to the aromatic nucleus, the thermoset foam having a specific surface area of at least 50 m²/g, and said pyrolysis comprising heating said composition to a temperature below 300°C to initiate reaction of said composition.

2. A black sorbent thermoset foam which has been prepared by the pyrolysis of a composition, liquid at the pyrolysis temperature, comprising at least one Lewis acid metallic salt and at least one aromatic nitrogen-containing compound having the general formula:

X — Ar — Y in which Ar represents an aromatic nucleus, X represents a substituent having a negative Hammett sigma constant and attached by a nitrogen, oxygen or sulphur atom, and Y represents a substituent having a positive Hammett sigma constant and attached by a nitrogen atom, the substituents X and/or Y forming part of a ring fused onto the aromatic nucleus or are attached to the aromatic nucleus, and after pyrolysis removing the remaining Lewis acid metallic salt, the thermoset foam being non-carcinogenic or otherwise toxic to humans and substantially free from low molecular weight fusible toxic components and so capable of being safely handled by man, said foam having a specific surface area of at least 50 m²/g, and said pyrolysis comprising heating said composition to a temperature below 300°C to initiate reaction of said composition.

3. A thermoset foam as claimed in claim 1 which has a specific surface area of at least 200 m²/g.

4. A method of making a black sorbent thermoset foam as claimed in claim 1 comprising heating to a pyrolysis temperature of below 300° C. to initiate reaction a composition which is liquid at the pyrolysis temperature and which comprises at least one Lewis acid metallic salt and at least one aromatic nitrogen-containing compound having the general formula:

X — Ar — Y in which Ar represents an aromatic nucleus in which X represents a substituent having a negative Hammett sigma constant and attached by a nitrogen, oxygen or sulphur atom, and Y represents a substituent having a positive Hammett sigma constant and attached by a nitrogen atom, the substituents X and/or Y forming part of a ring fused onto the aromatic nucleus or are attached to the aromatic nucleus.

5. A method as claimed in claim 4 in which the foam is subjected to further pyrolysis at a higher temperature under inert atmosphere after removal of the Lewis acid metallic salt to increase its surface area.

6. A method as claimed in claim 5 in which the further pyrolysis is effected at a temperature of 300° to 800° C.

7. A method as claimed in claim 5 in which the further pyrolysis is effected under a nitrogen atmosphere saturated with steam.

8. A method as claimed in claim 4 in which the substituent X in at least one said aromatic nitrogen-containing compound is selected from the group consisting of $-NH_2$, $-OH$ or $-SH$.

9. A method as claimed in claim 4 in which the substituent Y in at least one said aromatic nitrogen-containing compound is selected from the group consisting of $-NO_2$ or $-NO$.

10. A method as claimed in claim 1 in which at least one said aromatic nitrogen-containing compound is a nitroaniline.

11. A method of removing polar molecules from a fluid containing them in which a thermoset foam as claimed in claim 1 is placed in contact with the fluid and allowed to sorb the polar molecules.

12. The method of claim 4 wherein the pyrolysis is run at higher than atmospheric pressure.

13. The foam of claim 1 wherein said at least one aromatic nitrogen-containing compound is selected from:

m - nitroacetanilide,
p - nitroacetanilide,
2 - nitroaniline,
4 - nitroaniline,
amino - nitro - toluenes,
amino - nitro - xylene,
2,6 - dibromo - 4 - nitroaniline,
2,6 - dichloro - 4 - nitroaniline,
4 - nitrophenylhydrazine,
bis - (2-nitrophenyl urea).
nitronaphthyl amines having vacant positions ortho to the nitro and amino-groups,
5 - nitroindoline,
2 - chloro - 4 - nitroaniline,
2 - methyl - 4 nitroaniline,
5 - amino - 2 nitrobenzoic acid, 2 - amino - 4 nitrophenol,
3 - methyl - 4 - nitrophenol,
2 - amino - 7 nitrofluorene,
4 - nitrosophenol,
4 - nitrophenol,
4 - methylaminonitrobenzene,
4 - dimethylaminonitrobenzene,
2 - amino - 5 - nitropyridine,

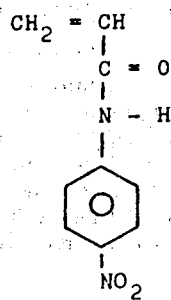

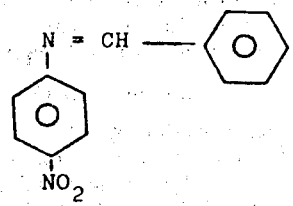

and

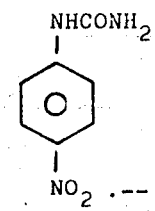

14. The process of claim 4 wherein said at least one aromatic nitrogen-containing compound is selected from:

m - nitroacetanilide,
p - nitroacetanilide,
2 - nitroaniline,
4 - nitroaniline,
amino - nitro - toluenes,
amino - nitro - xylene,
2,6 - dibromo - 4 - nitroaniline,
2,6 - dichloro - 4 - nitroaniline,
4 - nitrophenylhydrazine,
bis - (2-nitrophenyl urea).
nitronaphthyl amines having vacant positions ortho to the nitro and amino-groups,
5 - nitroindoline,
2 - chloro - 4 - nitroaniline,
2 - methyl - 4 nitroaniline,
5 - amino - 2 nitrobenzoic acid,
2 - amino - 4 nitrophenol,
3 - methyl - 4 - nitrophenol, 2 - amino - 7 nitrofluorene,
4 - nitrosophenol,
4 - nitrophenol,
4 - methylaminonitrobenzene,
4 - dimethylaminonitrobenzene,
2 - amino - 5 - nitropyridine,
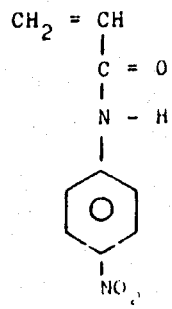
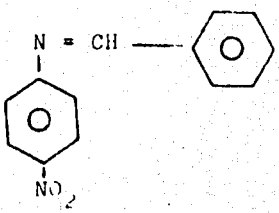
and
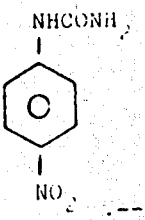
15. The foam of claim 1 wherein X and Y are directly attached to said aromatic nucleus.
16. The method of claim 4 wherein X and Y are directly attached to said aromatic nucleus.
* * * * *